Sept. 10, 1940.                B. DICK ET AL                    2,214,045
                             VALVE CONSTRUCTION
                             Filed April 22, 1939

INVENTORS
BURNS DICK
J. A. BEARD JR.
BY
ATTORNEY

Patented Sept. 10, 1940

2,214,045

UNITED STATES PATENT OFFICE 2,214,045

VALVE CONSTRUCTION

Burns Dick, Ferguson, and James A. Beard, Jr., Pine Lawn, Mo., assignors to Wagner Electric Corporation, St. Louis, Mo., a corporation of Delaware Application April 22, 1939, Serial No. 269,520

2 Claims. (Cl. 277—45)

Our invention relates to valves and more particularly to an outlet valve for the compressor or master cylinder of a hydraulic actuating system such as that employed in actuating vehicle brakes.

One of the objects of our invention is to produce an improved valve mechanism of the kind disclosed in the patent to Bowen No. 1,841,354, issued January 19, 1932, which controls the flow of fluid from and to the master cylinder as the piston thereof is actuated.

A more specific object of our invention is to produce a valve mechanism of the kind referred to which has its sealing parts so constructed that they will perform their sealing functions in an efficient manner, notwithstanding there may be some imperfections during manufacture or slight damage by handling.

Figure 1:
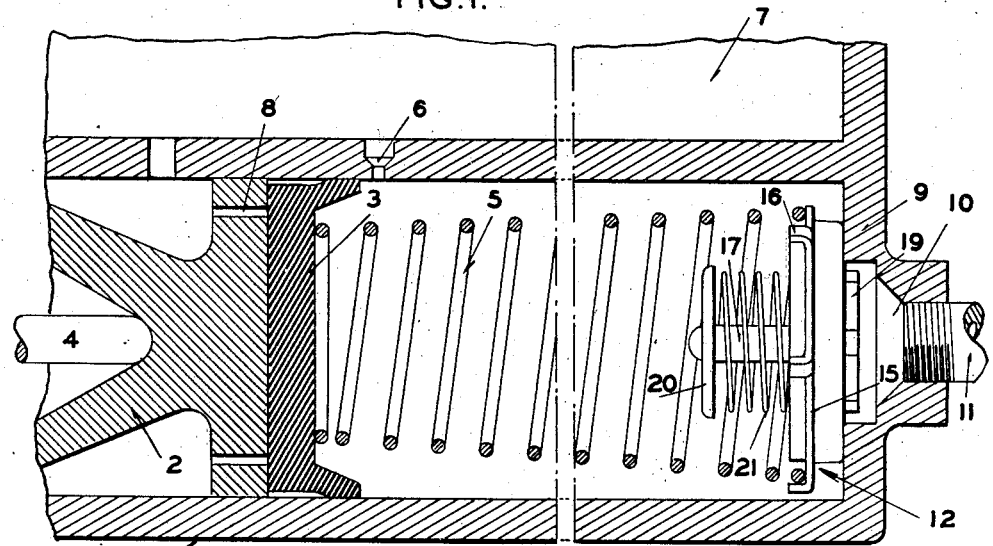
Figure 2:
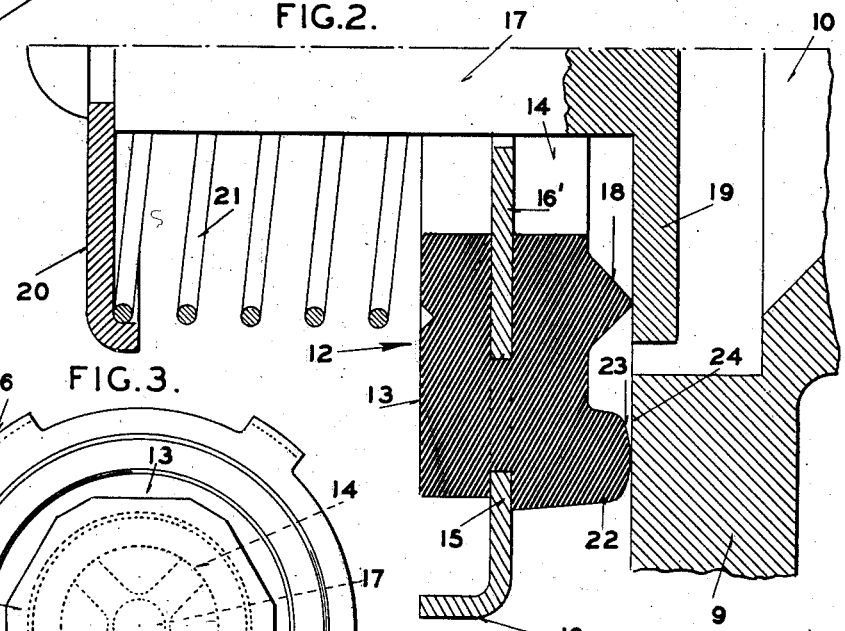

Other objects of our invention will become apparent from the following description taken in connection with the accompanying drawing in which Figure 1 is a cross-sectional view of a portion of a master cylinder showing my improved valve mechanism associated therewith; Figure 2 is an enlarged cross-sectional view of a portion of the improved valve mechanism associated with the end wall of the cylinder; and Figure 3 is an end view of the valve mechanism.

Referring to the drawing and particularly to Figure 1, there is disclosed a portion of a well-known master cylinder construction comprising a cylinder 1 within which is reciprocable a piston 2 having associated with its head a packing cup 3. The piston is adapted to be reciprocated by a piston rod 4 and returned to its normally inoperative position by a spring 5. When the piston is in the retracted position as shown, the packing cup 3 is positioned just rearwardy of a compensating porthole 6 for placing the cylinder ahead of the piston in communication with the reservoir 7. The head of the piston is provided with passages 8 which permit fluid at the rear of the head of the piston to flow past the lip of the cup during the retractile stroke of the piston in the event a subatmospheric pressure should develop in the cylinder ahead of the piston.

The forward wall 9 of the cylinder is provided with an outlet port 10 which is connected to a conduit 11 for carrying fluid under pressure to any suitable actuating motor for operating any desired device, as for example, the brakes of a motor vehicle. Associated with the outlet port 10 of the cylinder is my improved double acting valve mechanism 12 for controlling the flow of fluid from and to the cylinder as the piston is reciprocated. The valve mechanism is so constructed as to permit the fluid to flow freely from the cylinder to the conduit but to prevent fluid from flowing from the conduit to the cylinder unless the fluid in the conduit is above a predetermined value. The valve mechanism is associated with the end of the retractile spring 5 of the piston and the force with which this spring exerts pressure on the valve mechanism determines the minimum pressure of the fluid in the conduit sufficient to permit fluid to return to the cylinder.

Figure 3:
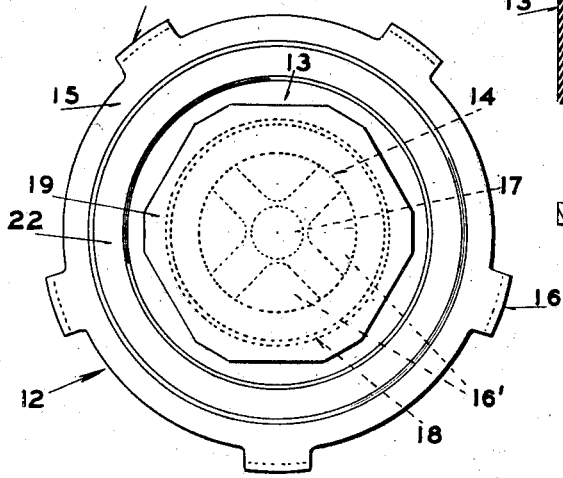

Referring particularly to Figures 2 and 3, the improved valve mechanism comprises a resilient valve member 13 made of rubber, rubber compound, synthetic rubber or some other like material. This resilient valve member is annular in form, being provided with an axial opening 14. In order that the valve member may have the proper rigidity, it has imbedded therein a metal disc 15 provided with lateral extending and circumferentially spaced turned over lugs 16 whereby the valve member may cooperate with the end of the retractile spring 5 of the piston in the master cylinder. The reenforcing disc also is provided with lugs 16' which project radially inwardly into the opening 14 in the valve member in order to form a guide for a valve stem 17.

The forward surface of the resilient valve member is formed with an annular rib 18 which surrounds the opening 14. This rib is of triangular cross section with its apex projecting outwardly. The circular ridge of the rib is slightly curved in order to form a good surface upon which the flat surface can seat. The ridge, however, is thin enough that the outer portion thereof is sufficiently soft and resilient to readily conform itself to either a slight indentation or protuberances on a surface when this surface is pressed down on a ridge by a light pressure. The valve stem 17 which is guided by the lugs 16' is provided at its forward end with an annular flange or disc 19 forming a movable valve element for cooperation with the rib 18 whereby, when the rib and flange are in engagement, fluid will be prevented from flowing through the opening 14 in the valve member 13 and in a direction from conduit 11 toward the cylinder. The rear end of the valve member carries a shoulder 20 and interposed between this shoulder and the valve member 13 is a light spring 21 for biasing the flange 19 against rib 18.

Also formed on the valve member 13 is a second annular rib 22 concentric with and surrounding the rib 18 and being generally rectangular in cross section and provided with a forward convex-like surface 23. This surface of the rib is adapted to engage the flat end wall surface 24 of the cylinder adjacent the outlet 10 and be pressed thereagainst by the retracting spring 5 of the piston. When the curved surface initially engages the flat surface of wall 24, the rib 22 will theoretically have a line contact with the surface and then as the pressure of the spring is exerted on the valve member, the curved surface 23 will be flattened out, the area in contact increasing in a radial direction from the original contacting line. This will result in the rib tightly engaging against the wall surface since any film of liquid which tends to remain between the surfaces 23 and 24 is eliminated by being forced outwardly from the initial contacting line. Thus the possibility of leakage of liquid at the cooperating surfaces will be considerably diminished if not entirely eliminated and insuring that the fluid in conduit 11 and associated system will be maintained under a pressure which will be determined by the strength of the spring 5.

From the above description of my improved valve mechanism, it is apparent that when the master cylinder piston 2 is moved forwardly, the valve disc 19 will be moved off rib 18 and permit fluid under pressure to pass to conduit 11. When piston 2 is permitted to return to its retracted position under the action of spring 5, the fluid under pressure in conduit 11 and associated system will press the valve disc 19 down onto the ridge of rib 18, thus efficiently sealing these parts together and preventing any leakage therebetween. The valve member 13, however, will be moved rearwardly by the fluid under pressure in conduit 11 and the surface 23 of rib 22 disengaged from the wall surface 24. Fluid will now be permitted to flow into the cylinder until the pressure in the conduit and the associated system becomes such a minimum value that it can no longer hold the valve member 13 in the position where the surfaces 23 and 24 are out of engagement. The surfaces 23 and 24 will now be engaged with each other to prevent additional fluid from passing into the cylinder. Since the construction of surface 23 is such that when it is forced into engagement with the flat surface 24, no film will be left between the surfaces, there will result a seal which will prevent any leakage, thereby maintaining the fluid in the conduit and associated system under a predetermined pressure.

By having the rib 18 on the valve member 13 and providing the valve disc with a smooth surface, a highly superior sealing action is obtained which cannot be done by the prior constructions wherein the valve member 13 is provided with a flat surface and the valve disc with an annular rib. The rib 18 is so constructed that its ridge will be relatively soft and resilient, thus permitting the edge to conform by light pressure to any imperfections in the flat surface of the disc 19 which may be caused during manufacture or by subsequent handling. Also by having the rib 18 on the valve member 13, it is unnecessary to have the guide for the stem 17 accurately constructed as the same portion of the valve disc 19 need not engage the ridge of the rib.

The particular curved construction of the surface of the outer rib 22 insures that it will always make a good sealing engagement with the flat surface of the end wall. In prior constructions the surface of this rib was flat and a film was trapped between this surface and the end wall surface when the two surfaces were forced toward each other, thus preventing a good sealing action. The curved surface construction of the rib 22 in applicant's valve mechanism results in the film being forced away from the sealing surfaces as the spring pressure is applied to the valve member, thus obtaining a good seal between the surfaces.

Being aware of the possibility of modifications in the particular structure herein described without departing from the fundamental principles of our invention, we do not intend that its scope be limited except as set forth by the appended claims.

Having fully described our invention, what we claim as new and desire to secure by Letters Patent of the United States is:

1. In valve mechanism of the class described for cooperation with the flat surface of a wall of a cylinder having an outlet and with a piston retracting spring, a valve member having a central opening, said member being provided with an annular rib of resilient material in surrounding relation to the opening and being generally triangular in cross section with its apex positioned outwardly, a second valve member comprising a stem extending through the opening of the first valve member and an annular flange provided with a flat surface for cooperation with the ridge portion of the rib, a spring cooperating with the stem and the first valve member for biasing the flange against the rib, and means forming a second annular rib of resilient material on the first named valve member concentric with and in surrounding relation to the first named rib, said last named rib having a convex-like surface adapted to cooperate with the flat surface of the end wall of the cylinder adjacent the outlet when the valve mechanism is interposed between the end of th piston retractile spring and the end cf the cylinder, the surface of said rib when initially engaging the cylinder wall having line contact therewith and then an increasing area of contact when the rib is deformed as a result of the action of the spring.

2. In unitary valve mechanism of the class described for interposition between the flat end wall surface surrounding the outlet of the cylinder of a master cylinder device and the piston retracting spring to thereby control the flow of fluid through the outlet, a valve member having a central opening and adapted to be engaged by the end of the spring, said valve member being provided on its surface which is adjacent the outlet with an annular rib of resilient material in surrounding relation to the opening and of generally triangular cross section with the apex positioned outwardly, a second valve member comprising a stem extending through the opening of the first valve member and having an annular flange of non-yieldable material provided with a flat surface for engaging and compressing the ridge portion of the rib to thereby positively seal the opening notwithstanding slight lateral shifting of the stem, a spring cooperating with the stem and the first valve member and biasing the flat surface of the flange against the rib, and means forming a second annular rib of resilient material on the first named valve member and concentric with and in surrounding relation to the first named rib, said last named rib cooperating with the flat end wall surface of the cylinder and being biased into engagement with said surface by the action of the piston retracting spring on the first named valve member.

BURNS DICK.
JAMES A. BEARD, Jr.